(12) United States Patent
Tamai

(10) Patent No.: US 6,244,671 B1
(45) Date of Patent: Jun. 12, 2001

(54) HYDRAULIC ACTUATOR FOR A BRAKE SYSTEM

(75) Inventor: Nobuhiro Tamai, Zama (JP)

(73) Assignee: Unisia Jecs Corporation, Kanagawa (JP)

( * ) Notice: Subject to any disclaimer, the term of this patent is extended or adjusted under 35 U.S.C. 154(b) by 0 days.

(21) Appl. No.: 09/425,998

(22) Filed: Oct. 25, 1999

(30) Foreign Application Priority Data

Oct. 23, 1998 (JP) .................................................. 10-302234

(51) Int. Cl.[7] .............................. B60T 8/34; B60T 8/36; B60T 17/00
(52) U.S. Cl. ............................... 303/119.3; 303/DIG. 10; 137/884
(58) Field of Search ............................. 303/119.3, 119.2, 303/113.1, DIG. 10, 116.4; 137/884, 596.17; 251/129.01–129.22; 335/255, 278; 439/36; 336/192, 90

(56) References Cited

U.S. PATENT DOCUMENTS 5,449,226    9/1995   Fujita et al. .
5,452,948 *  9/1995   Cooper et al. ..................... 303/119.3

* cited by examiner

Primary Examiner—Douglas C. Bulter
(74) Attorney, Agent, or Firm—Sughrue, Mion, Zinn, Macpeak & Seas, PLLC

(57) ABSTRACT

A hydraulic actuator for a brake system which includes a housing having a hydraulic circuit in which brake oil flows, a control unit being attached on one side of the housing, and similarly, a motor being attached on the other side thereof. A first terminal connected to the motor extends through a hole formed in the housing. A connector for the motor, having an outside portion that is made of an electrical insulating material is fitted into the hole. The inside portion is adapted to retain the first terminal that is electrically connected to the motor. A connector for the control unit, which has and inside portion for retaining a second terminal that is electrically connected to the control unit, and also has an external portion that can be plugged into the connector for the motor. When the motor, the motor connector, and the control unit connector are mated, the first terminal and the second terminal will establish connector between the motor and the control unit.

20 Claims, 3 Drawing Sheets

HYDRAULIC ACTUATOR FOR A BRAKE SYSTEM

BACKGROUND OF THE INVENTION

This invention relates to a hydraulic actuator used for a brake system, and in particular a hydraulic actuator that controls the brake pressure of an automotive wheel in order to prevent wheel locking or to apply an optimal traction to driven wheels. Many different types of hydraulic actuator for a brake system have been proposed. One such hydraulic actuator includes a housing having a hydraulic circuit through which a brake oil flows, a plurality of solenoid valves placed in respective bores formed in the housing, a motor attached on one side of the housing, and a control unit attached on the other side thereof. The control unit controls the solenoid valves and the motor so as to apply an optimized brake pressure to the wheels in accordance with the condition of the wheels. As an example, in U.S. Pat. No. 5,449,226, the hydraulic actuator includes a housing, which is made of aluminum and has an opening or a hole through which a lead line is extended. A control unit and a motor are attached to one side and opposite side of the housing, respectively. A negative terminal of the motor is connected to the housing so as to establish a connection ground. One end of the lead line is connected to a positive terminal of the motor by welding. The other end of the lead line is connected to an end portion of the control unit so that the control unit can control the motor.

In this case, welding is required to connect the positive terminal of the motor with the end of the lead line, so that it increases the ease of assembly. Moreover, when the hydraulic actuator is exposed to a severe oscillation condition, the connection of the lead between the motor and the control unit might become poor or entirely broken. Furthermore, the positive lead disposed in the opening or the hole may contact with an internal surface of the opening or hole due to the oscillation, and short-circuit.

SUMMARY OF THE INVENTION

It is, therefore, an object to the present invention to provide an improved a hydraulic actuator for a brake system which achieves high efficiency for assembly and high electrical reliability.

In order to achieve the object, there is provided a hydraulic actuator for a brake system which includes a housing having a hydraulic circuit in which brake oil flows, a control unit being attached on one side of the housing, and similarly, a motor being attached on the other side thereof. A first terminal connected to the motor extends through a hole formed in the housing. A connector for the motor, having an outside portion that is made of an electrical insulating material is fitted into the hole. The inside portion is adapted to retain the first terminal that is electrically connected to the motor. A connector for the control unit, which has an inside portion for retaining a second terminal that is electrically connected to the control unit, also has an external portion that can be plugged into the connector for the motor. When the motor connector and the control unit connector are mated, the first terminal and the second terminal will establish an electrical connection between the motor and the control unit.

DETAILED DESCRIPTION OF THE PREFERRED EMBODIMENT OF THE INVENTION

A hydraulic actuator for a brake system in accordance with preferred embodiments of the present invention will be described with reference to the Figures.

Figure 1:
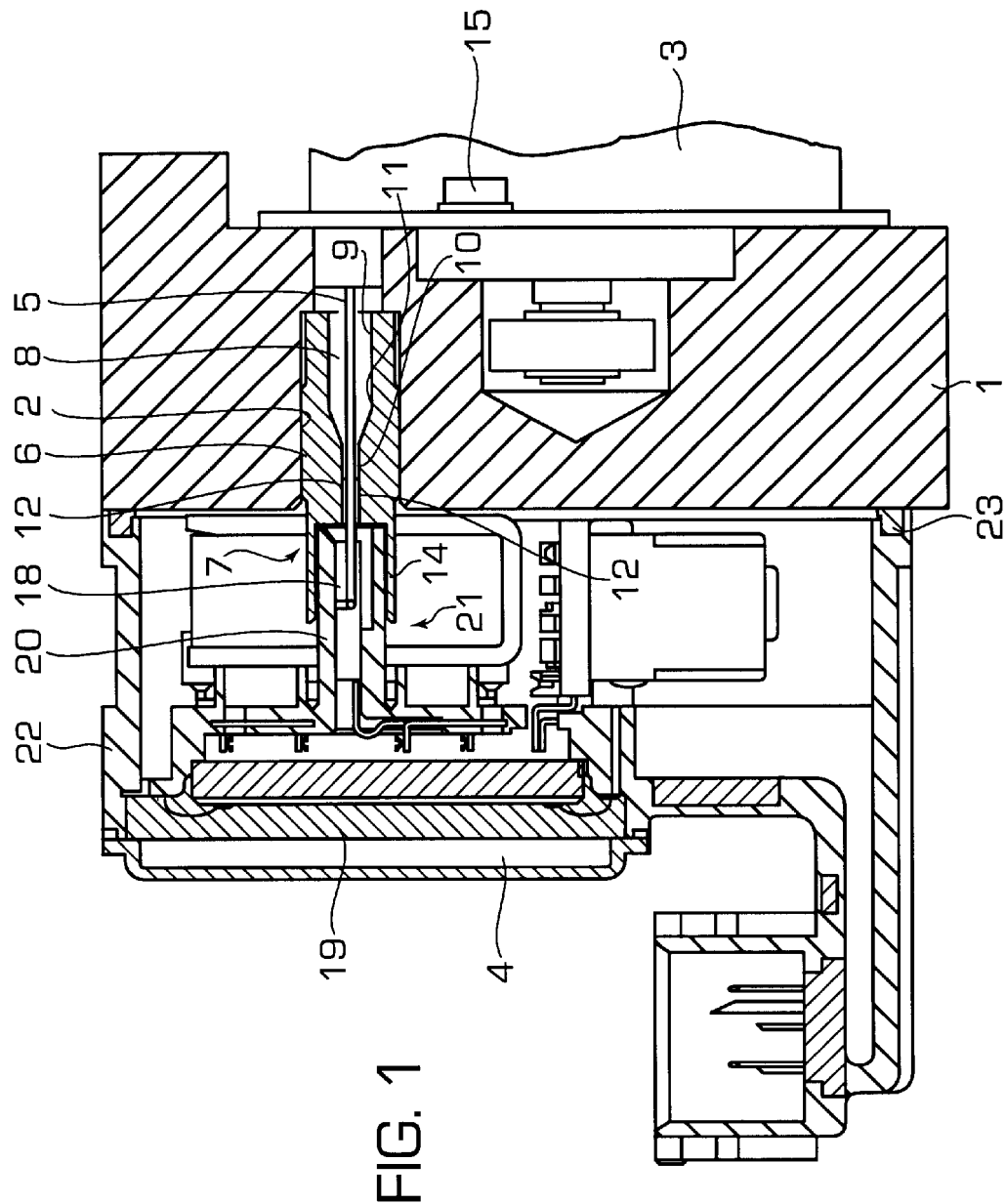
FIG. 1 is a sectional drawing, showing a hydraulic actuator for a brake system in accordance with the invention.

FIG. 1 shows a hydraulic actuator for a brake system, especially applied to an anti lock brake system for an automotive vehicle. A housing 1, which is made of aluminum, is provide with a hydraulic circuit (not shown) in which brake fluid flows. A pump (not shown) is disposed in a conventional position of the hydraulic circuit in the housing 1 and is driven by a motor 3 so as to pressurize the brake fluid or discharge the brake fluid from a reservoir (not shown). A control unit 4 and the motor 3 are attached on the opposite sides of the housing 1 so that the control unit 4 controls the motor 3 to operate the pump. The housing 1 has at least one hole 2 through which electrical wiring extends between the control unit 4 and the motor 3.

A first conductive terminal 5 of the motor 3 is shaped like a long and thin plate that extends from the body of the motor 3. One end of the first conductive terminal 5 is electrically connected to an electric coil (not shown) of the motor 3. The other end of the first conductive terminal 5, when assembled with the actuator, is fitted into a first guide member 6, which is placed within the hole 2.

Figure 4:
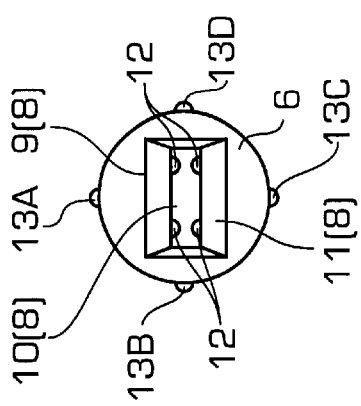
FIG. 4 is an enlarged and a left side view of a guide in FIG. 1.
Figure 2:
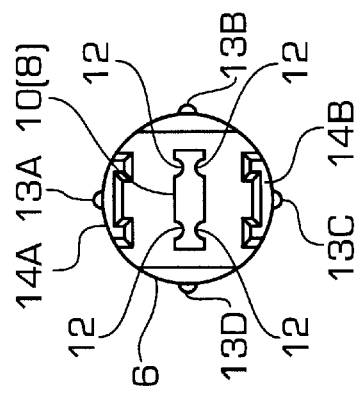
FIG. 2 is an enlarged sectional view of a guide in FIG. 1.

As seen in FIG. 1, the first guide member 6 is shaped from an input end that easily receives the end of the first terminal 5 to a central portion with decreased dimension that firmly holds the end of the first conductive terminal 5. The first guide member 6, which is made of an electrically insulating material, such as synthetic resins, is substantially shaped like a cylindrical column as a whole. A rectangular-shaped bore 8 is formed in the first guide member 6, along its longitudinal central axis, so that the first conductive terminal 5 may be inserted therein. The rectangular-shaped bore 8 includes a wide bore portion 9, a narrow bore portion 10, and tapered bore portion 11. The wide bore portion 9 is integrally connected to the narrow bore portion 10 by way of the tapered bore portion 11. In other words, the wide bore portion 9 tapers off to the narrow bore portion 10. As shown FIG. 2 and FIG. 4, four retainers 12 are formed on an inner wall of the narrow bore portion 10 in the direction along its longitudinal axis and protrude therefrom for contacting and retaining the first conductive terminal 5.

Figure 3:
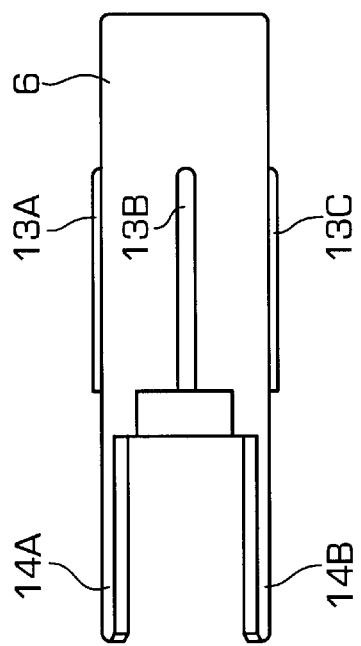
FIG. 3 is an enlarged and a right side view of a guide in FIG. 1.

A plurality of protrusions are formed on an outer periphery of the first guide member 6 in the direction along its axis. In this embodiment, there are four protrusions 13A, 13B, 13C, 13D positioned on the outer periphery of the first guide member 6 for permitting the first guide member 6 to be inserted and fixed easily into the hole 2 formed in the housing 1. As are seen FIG. 2 and FIG. 3, a pair of guides 14A, 14B, extend in the direction along the first guide member 6 axis, from an end of the first guide member 6 where the narrow bore portion 10 is opened. Thus, the guides 14A, 14B guide and solidly retain a second connector 21 of the control unit 4.

The first conductive terminal 5 is inserted into the rectangular-shaped bore 8 from the wide bore portion 9 opened to a side surface of the first guide member 6 and is supported by the retainers 12 of the first guide member 6. Similarly, the first guide member 6 is inserted and fixed into the hole 2 in the housing. Accordingly, it becomes possible to have a first connector terminal 7 be inserted and fixed into the hole 2 in the housing 1. The first connector terminal 7 is a "male" connector and has the first conductive terminal 5 which is protruded from the narrow bore portion 10, for plugging into a second connector 21 for the control unit 4.

The motor 3 is secured to the housing by the bolts 15, and a seal member (not shown) is inserted between them.

As illustrated in FIG. 1, the control unit 4 has a second conductive terminal 18 that is elongated and extended therefrom. The second connector 21 for the control unit 4 includes the second conductive terminal 18, which is electrically connected to a circuit board 19, and a second guide member 20, which supports an end of the second conductive terminal 18. The second connector 21 is a "female" connector for mating with the first connector 7. Namely, the second conductive terminal 18 is a rolled, bent or compressed conductor material that is inserted into the second connector 21 so as to receive and mate with the first conductive terminal 5 of the first guide member 6 when the first guide member 6 receives the second guide member 20. A seal member 23 is inserted between the housing 1 and the casing 22 that contains the second connector 21 of the control unit 4 and the circuit board 19.

Assembly of the hydraulic actuator according to the invention will be described next. At first, the motor 3 is brought into attachment on one side surface of the housing 1 near the hole 2. Then, the motor 3 is bolted onto the housing 1 by bolt 15. And then, the first conductive terminal 5 is inserted into the hole 2 from its opening on the one side surface of the housing 1. Finally, the first guide member 6 is fitted to a tip portion of the first conductive terminal 5 from the opening of the hole 2 on the other side surface of the housing 1. Therefore, the first guide member 6 and the first conductive terminal 5, when joined, form the first connector 7 in contact with the motor 3.

Figure 5:
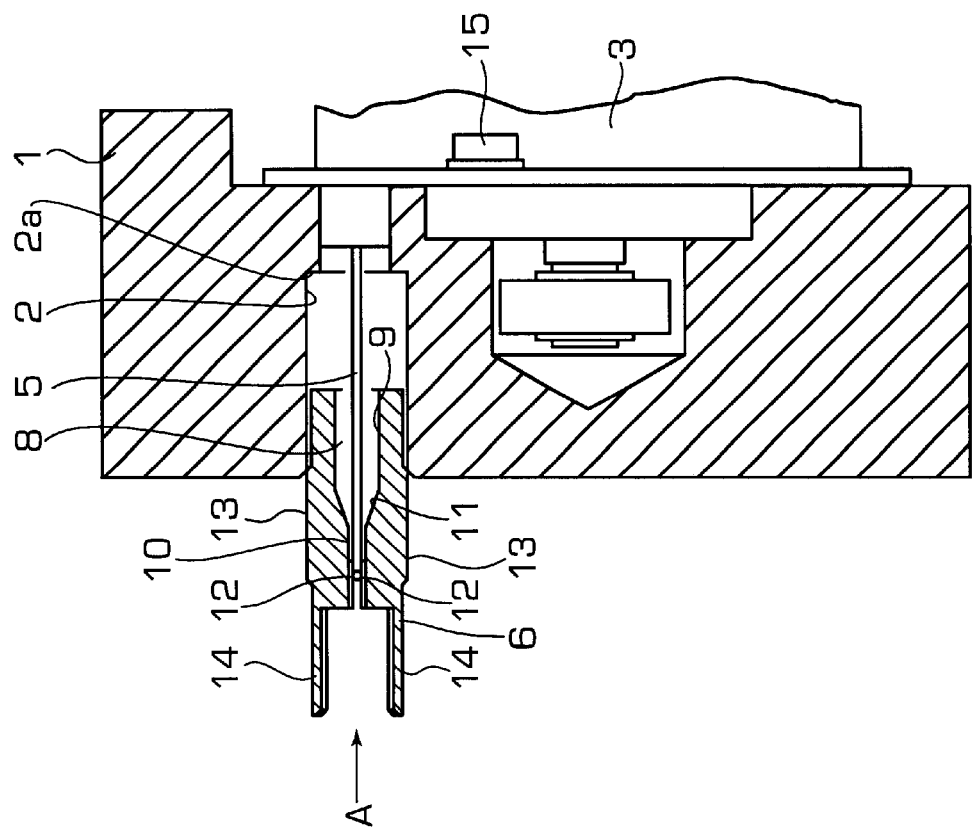
FIG. 5 is a process drawing, showing a step of beginning to insert a guide onto the tip of a lead of a motor in FIG. 1.
Figure 6:
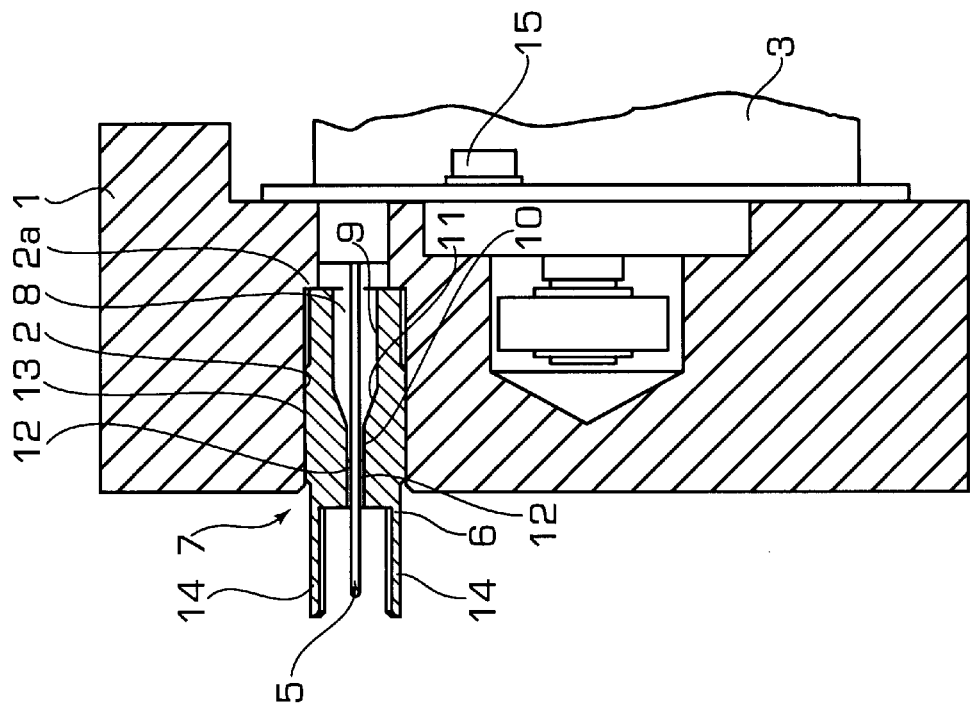
FIG. 6 is a process drawing, showing a step of completing to the insertion of a guide onto the tip of a lead of a motor in FIG. 1.

As illustrated in FIG. 5 and FIG. 6, the first guide member 6 may be fit onto the tip portion of the first conductive terminal 5. At first, the first guide member 6 is inserted into the hole 2 from the other side surface of the housing 1 that is opposite to the one side surface where the motor 3 is attached. Namely, the first guide member 6 is moved into the hole 2 in the direction of the arrow A, so that the first conductive terminal 5 is easily inserted in the rectangular-shaped bore portion 8, after being guided by a wide bore portion 9 and tapered bore portion 11. As is seen in FIG. 5, as the guide member 6 is moved into the hole 2 in the direction of arrow A, the first conductive terminal 5 is inserted into the rectangular-shaped bore 8 and retained against the retainers 12. As is seen in FIG. 6, the guide member 6 is moved further into the hole 2 until the guide member 6 contacts a stepped portion 2a of the hole 2. The protrusions 13A, 13B, 13C, 13D on the outer periphery of the first guide member 6 are fitted in corresponding concave portions (not shown) formed in the housing 1. Thereby, the first guide member 6 is easily inserted and solidly fixed in the hole 2 without establishing a complete contact between an inner periphery of the through hole 2 and an outer periphery of the first guide member 6.

As is seen in FIG. 1, the second connector 21 of the control unit 4 has a second guide member 20 that is fitted to a tip portion of the second conductive terminal 18 and mates with the first connector 7 of the motor 3. Mating is completed by attaching the control unit 4 to the housing 1. In detail, the first conductive terminal 5 which protrudes from the first guide member 6 is plugged into an inner portion of the second conductive terminal 18. The pair of guides 14 guides the movement of the second connector 21 and retains the second connector 21. With this, the first connector 7 of the motor is electrically connected with the second connector 21 of the control unit 4 so that the control unit 4 controls the pump (not shown).

Therefore, this electrical connection between the motor 3 and the control unit 4 is easily completed at the same time that the control unit 4 is assembled to the motor 3 and to the housing 1. Thus, the hydraulic actuator can be assembled easily, so that the cost for producing the hydraulic actuator is reduced.

According to the disclosed embodiment, since the electrical connection between the motor 3 and the control unit 4 is established by mating the first and second connectors 7, 21, a poor connection between the first and second conductive terminals 5, 18 is prevented. Further, the outer peripheral surface of the first terminal 5 is surrounded and retained by the first guide member 6, which is made of electrical insulating material. Therefore, even if the hydraulic actuator is placed under severe oscillation, the first terminal 5 is pretended from vibrating and contacting an inner surface of the hole 2. Namely, this arrangement avoids the occurrence of a short-circuit, so that the reliability of the electrical connection between the motor 3 and the control unit 4 is significantly improved.

Further, since the first connector 7 has the first guide member 6, which is provided with the pair of the guide liners 14A, 14B that guide and retains the second connector 21, the connection between the first and second connectors 7, 21 is established easily and firmly.

Therefore, the present embodiment are to be considered as illustrative and not restrictive and the invention is not to be limited to the details given herein, but may be modified within the scope and equivalence of the appended claims. For example, on the one hand the first terminal 5 may be connected to the control unit 4, the other the second terminal 18 may be connected to the motor 3.

The entire contents of basic Japanese Patent Application, application No. 10-302234, filed Oct. 23, 1998, of the application, of which priority is claimed, is herein incorporated by reference.

What is claimed is:

1. A hydraulic actuator for a brake system comprising:
   a) a housing having a hydraulic circuit in which a brake oil flows and a hole therein;
   b) a motor attached on one side of the housing;
   c) a first terminal connected to the motor and extending through the hole;
   d) a control unit attached on the opposite side of the housing;
   e) a second terminal connected to the control unit;
   f) a first connector, which comprises an electrical insulating material, for holding the first terminal; and
   g) a second connector, retaining the second terminal, and adapted for being plugged into the first connector.

2. The hydraulic actuator for a brake system as set forth as claim 1, wherein the first connector is fitted in the hole formed in the housing.

3. The hydraulic actuator for a brake system as set forth as claim 2, wherein the first terminal is enclosed with the first connector in a position of the hole.

4. The hydraulic actuator for a brake system as set forth as claim 3, wherein the first connector comprises a guide liner for supporting the second connector.

5. The hydraulic actuator for a brake system as set forth as claim 4, wherein the first connector comprises at least one protrusion formed on the outer periphery thereof, and being engaged in concave portion formed in the housing.

6. The hydraulic actuator for a brake system as set forth as claim 5, wherein the first connector comprises a retainer for retaining the first terminal.

7. The hydraulic actuator for a brake system as set forth as claim 6, wherein the first connector comprises a wide bore portion is integrally connected to a narrow bore portion by way of a tapered bore portion for enclosing the first terminal.

8. The hydraulic actuator for a brake system as set forth as claim 1, wherein the housing has a longitudinal axis for connection engagement and the first connector further comprises:

a first body extending along the longitudinal axis, the first body having
  a) an external surface sized to fit into the hole of the housing;
  b) a first internal space into which the first terminal is inserted;
  c) a recessed first connector end portion having an internal surface for receiving the second connector; and
  d) a motor end portion for retaining the first terminal; and the second connector comprises:
    a second body extending along the longitudinal axis, the second body having
      a) a projected second connector portion for insertingly mating with the first connector end portion; and
      b) a second recessed internal surface for retaining the second terminal; and
      wherein an electrical connection between the motor and the control unit is established when the first connector and second connector are mated.

9. The hydraulic actuator for a brake system as set forth as claim 8, wherein:

the motor end portion comprises a wide portion, a narrow portion, and a tapered portion; and wherein the wide portion and the narrow portion are integrally connected by the tapered portion and are operative for receiving the first terminal.

10. The hydraulic actuator for a brake system as set forth as claim 9, wherein:

the first connector further comprises at least one protrusion formed on the external surface and extending parallel to the longitudinal axis for fitting into a corresponding concave portion formed on an inner surface of the hole and extending parallel to the longitudinal axis.

11. The hydraulic actuator for a brake system as set forth as claim 10, wherein: the first connector further comprises a plurality of retainers formed on the narrow portion of the first body for retaining the first terminal.

12. The hydraulic actuator for a brake system as set forth as claim 11, wherein:

at least one of the wide portion, the narrow portion and the tapered portion is rectangular in cross section, and wherein the first terminal is shaped as a wide flat conductor.

13. The hydraulic actuator for a brake system as set forth as claim 12, wherein the first connector comprises at least one guide liner, formed on the first connector portion, and extending parallel to the longitudinal axis for mating with the second connector.

14. The hydraulic actuator for a brake system as set forth as claim 13, wherein the second terminal is shaped as a rolled, bent or compressed conductor and is inserted in the second connector portion and disposed for mating with the first terminal.

15. The hydraulic actuator for a brake system as set forth as claim 14, wherein the first and second connectors are constructed for mating at a position that is out of the housing.

16. A hydraulic actuator for a brake system comprising:

a housing having a hydraulic circuit in which a brake oil flows and a hole therein;

a motor attached on one side of the housing;

a first terminal connected to the motor and extending through the through hole;

a control unit attached on the opposite side of the housing;

a second terminal connected to the control unit;

a connecting means for connecting the first terminal to the second terminal via connectors.

17. The hydraulic actuator for a brake system as set forth as claim 16, wherein the connecting means comprises a first connector for holding the first terminal and a second connector for holding the second terminal connected to the control unit.

18. The hydraulic actuator for a brake system as set forth as claim 17, wherein the first connector is made of an electrical insulating material and, being fitted in the hole formed in the housing, wherein the first terminal is enclosed with the first connector in a position of the hole.

19. A method for assembling a hydraulic actuator for a brake system comprising the step of:

attaching a motor on one side of surface of a housing;

inserting a first terminal connected to the motor into a hole formed in the housing from its opening on the one side surface thereof;

forming a first and a second connector, being connected to the first terminal and a control unit respectively;

mating the first connector with the second connector; and attaching a control unit on opposite side of a surface of the housing.

20. A method for assembling a hydraulic actuator for a brake system as claimed in claim 19 further comprising the step of:

enclosing the first terminal with the first connector which is made of an electrical insulating material in a position of the hole when the first connector is formed.

* * * * *